(12) United States Patent
Gilberton et al.

(10) Patent No.: US 10,375,518 B2
(45) Date of Patent: Aug. 6, 2019

(54) DEVICE AND METHOD FOR MONITORING PROXIMITY BETWEEN TWO DEVICES

(71) Applicant: THOMSON LICENSING, Issy de Moulineaux (FR)

(72) Inventors: Philippe Gilberton, Geveze (FR); Yvon Legallais, Rennes (FR); Patrick Fontaine, Rennes (FR)

(73) Assignee: InterDigital CE Patent Holdings, Paris (FR)

( * ) Notice: Subject to any disclaimer, the term of this patent is extended or adjusted under 35 U.S.C. 154(b) by 227 days.

(21) Appl. No.: 14/549,503

(22) Filed: Nov. 20, 2014

(65) Prior Publication Data
US 2015/0148066 A1  May 28, 2015

(30) Foreign Application Priority Data
Nov. 22, 2013 (EP) .................................. 13306600

(51) Int. Cl.
| H04W 88/02 | (2009.01) |
| H04W 4/02 | (2018.01) |
| G08B 13/14 | (2006.01) |
| G08B 21/02 | (2006.01) |

(52) U.S. Cl.
CPC ........ *H04W 4/023* (2013.01); *G08B 13/1427* (2013.01); *G08B 21/0213* (2013.01); *G08B 21/0247* (2013.01)

(58) Field of Classification Search
CPC .... H04W 4/023; G08B 13/1427; G08C 17/02
See application file for complete search history.

(56) References Cited

U.S. PATENT DOCUMENTS

| 6,631,271 | B1 | 10/2003 | Logan |
| 7,257,374 | B1 * | 8/2007 | Creigh ........................ 455/41.2 |
| 7,274,292 | B2 | 9/2007 | Velhal et al. |
| 7,623,030 | B1 | 11/2009 | Popescu |
| 7,994,918 | B2 | 8/2011 | Lai et al. |
| 8,140,012 | B1 | 3/2012 | Causey et al. |
| 8,254,902 | B2 | 8/2012 | Bell et al. |
| 8,380,226 | B2 | 2/2013 | Clipsham |
| 2003/0101225 | A1 | 5/2003 | Han et al. |
| 2007/0288279 | A1 | 12/2007 | Haugen et al. |

(Continued)

FOREIGN PATENT DOCUMENTS

| CN | 101420471 | 4/2009 |
| JP | 11262065 A | 9/1999 |

(Continued)

OTHER PUBLICATIONS http://www.bikn.com/design-your-bikn.php; Oct. 14, 2014; pp. 1-4.

(Continued)

*Primary Examiner* — Pakee Fang
(74) *Attorney, Agent, or Firm* — Myers Wolin LLC

(57) ABSTRACT

A device and method for monitoring a first device proximity to a second device is disclosed. The first device is for example a smartphone and the second device is for example a wearable device. Proximity between both devices is monitored in conjunction with an electronic calendar so as to trigger an alert in case proximity between both devices is going to be lost while an event of the calendar is imminent.

17 Claims, 4 Drawing Sheets

(56) References Cited

U.S. PATENT DOCUMENTS

| | | |
|---|---|---|
| 2009/0102637 A1 | 4/2009 | Hsu |
| 2009/0305744 A1 | 12/2009 | Ulrich |
| 2010/0048185 A1 | 2/2010 | Lee et al. |
| 2010/0090831 A1 | 4/2010 | Zhao et al. |
| 2010/0222033 A1* | 9/2010 | Scott .................. H04M 3/5322 455/414.1 |
| 2011/0059769 A1 | 3/2011 | Brunolli |
| 2011/0183650 A1* | 7/2011 | McKee ............. H04M 1/72519 455/413 |
| 2012/0309373 A1 | 12/2012 | Abogendia |
| 2013/0072173 A1 | 3/2013 | Brady |
| 2013/0103761 A1 | 4/2013 | Dunko |

FOREIGN PATENT DOCUMENTS

| | | |
|---|---|---|
| JP | 2002335185 A | 11/2002 |
| JP | 2003101618 A | 4/2003 |
| JP | 2003258942 A | 9/2003 |
| JP | 200624165 | 1/2006 |
| JP | 2006129231 A | 5/2006 |
| JP | 2007328527 | 12/2007 |
| KR | 2013022430 | 3/2013 |
| WO | WO2007121334 | 10/2007 |

OTHER PUBLICATIONS http://cobratag.com/overview/; Oct. 14, 2014; 1 page only.
http://www.kickstarter.com/projects/embraceplus/embrace-a-smart-piece-of-wearable-technology; Jun. 9, 2013; pp. 1-6.
https://play.google.com/store/apps/details?id=com lookout; Oct. 14, 2014; pp. 1-2.
http://www.sticknfind.com/; Oct. 14, 2014; pp. 1-3.
Search Report dated Mar. 21, 2014.
Office Action issued by the Chinese Intellectual Property Office for corresponding Chinese Patent Application No. 2014106694340, dated Jun. 5, 2018, with an English translation.
Notice of Reasons for Rejection issued by the Japanese Patent Office Office for corresponding Japanese Patent Application No. 2014-236734, dated Sep. 3, 2018, with an English translation.

* cited by examiner

DEVICE AND METHOD FOR MONITORING PROXIMITY BETWEEN TWO DEVICES

This application claims the benefit, under 35 U.S.C. § 119 of European Patent Application No. 13306600.1, filed Nov. 22, 2013.

FIELD OF THE INVENTION

The present invention generally relates to the field of mobile devices, such as mobile phones and tablets.

More particularly, the invention deals with the monitoring of the location of a user's mobile device in order to prevent an oversight of the mobile device.

Thus, the invention concerns a method of monitoring a first device proximity to a second device.

It also concerns corresponding first and second devices and a computer program implementing the monitoring method of the invention.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The use of mobile phones and tablets has recently become very popular. Consequently, a high number of user centric applications relying on how better to manage or anticipate the user's everyday's digital life appeared, rendering these mobile devices important for performing many tasks in the personal or professional life of the user. Thus, forgetting or losing such mobile devices could be really painful for the user.

Some applications exist in the market that allow to retrieve mobile devices in case of lost, theft or oversight.

For instance, there exists a solution consisting in storing regularly GPS (Global Positioning System) coordinates of the mobile device. The stored coordinates can then be uploaded online by the user with any browser available on an Internet connected computer.

Some other existing solutions consist in detecting and alerting the user that he is getting away from his mobile device. These solutions are generally based on RSSI (Received Signal Strength Indication) measurements to estimate the range between a transmitter attached to the mobile device and a receiver attached to the user. These solutions are not limited to mobile phones but may be used to track any valuable devices for the user such as keys. They usually use short range, low power consumption wireless interfaces to perform the monitoring, for example RFID (Radio Frequency IDentification), Bluetooth, ZigBee.

However, using such solutions, the user may be annoyed by receiving an alert each time that he gets away from his mobile device, especially when he does not need to have the mobile device with him at this time.

SUMMARY OF THE INVENTION

The present invention proposes a solution for improving the situation.

Accordingly, the present invention provides a method of monitoring a first device proximity to a second device, comprising:

a) monitoring at least one wireless link between said first device and said second device;

b) if said wireless link is disrupted while an event stored in an electronic calendar is imminent, notifying a user about a loss of proximity of said first device by triggering an alert by the second device, wherein the alert has a level depending on the imminence of the event and/or on the location of the first device.

By imminence of the event, it is meant here the time range, for instance expressed in minutes, between the current time and the event time stored in the electronic calendar. The event is considered as imminent if this time range is less than a given threshold. This threshold is preferably set between five and thirty minutes. Preferably, this threshold can be changed by the user.

Thus, the present invention enables to monitor the proximity of the first device with the second device. The user is notified about the loss of this proximity when an event is imminent.

For example, the event may be a meeting or a business trip departure or any other event, stored within the electronic calendar of the user, for which the first device is needed.

Consequently, the invention ensures that the user has his first device with him at the relevant time.

Preferably, the alert is dedicated to the notification task of the loss of proximity, so that the user cannot confuse this alert with another alert of the second device.

The alert may be of any possible type, for instance audio, visual or textual.

The alert may also be in the form of a vibration of the second device.

For instance, the level of the alert may be higher 5 minutes before the event than 15 minutes before the event.

According to another example, the level of the alert may be higher if the first device is in a public area such as a railway station than in a private area such as the user's home. Indeed, the risk that the first device is lost or stolen is higher in a public area.

Advantageously, the wireless link is disrupted when a Received Signal Strength Indication, RSSI, measured on a wireless link between the first device and the second device is less than a threshold.

Said wireless link may be, for instance, a Wi-Fi or a Bluetooth link.

Preferably, said threshold is fixed as a function of the imminence of said event.

The first device is preferably a mobile terminal of the user, for instance a smartphone.

The second device is preferably a device that the user always carries with him, such as a connected bracelet, for instance a smart watch.

More than one second device can be used. For example, at home, a smart watch and a residential gateway can be used as second devices whereas at the office, a smart watch and a PC or a laptop can be used as second devices.

The monitoring of the wireless links between the first device and each one of the second devices provides a more accurate indication of the location of the first device.

Advantageously, the monitoring of the wireless link is performed periodically.

According to a first embodiment, the monitoring is performed by the first device.

In this case, notifying the user comprises sending a notification to the second device.

According to a first example, there is a second communication link between the first and the second devices which is not disrupted. For instance, the second device may have two wireless interfaces. In a variant, both devices may be still connected through an indirect wireless link using a third device connected to both the first and the second devices.

According to a second example, the RSSI threshold is fixed so as to still enable a possible communication between the first and second devices in order for the second device to be able to receive the notification from the first device.

According to a second embodiment, the monitoring is performed by the second device.

According to a third embodiment, the monitoring is performed by both the first and second devices.

Advantageously, the frequency of said monitoring depends on the imminence of the event.

Thus, a link disruption can be detected efficiently while saving the battery of the monitoring device.

Advantageously, if the first device is in a public area, the method comprises locking said first device when the wireless link with the second device is disrupted. When the first device performs itself the monitoring, the first device operates said locking itself.

The invention also provides a first device, comprising:
a) a monitoring module able to monitor at least one wireless link between said first device and a second device;
b) a notification module able to send to the second device a notification about a loss of proximity of said first device if said wireless link is disrupted while an event stored in an electronic calendar is imminent, wherein the notification triggers an alert in the second device, said alert having a level depending on the imminence of the event and/or on the location of the first device.

Advantageously, the first device is able to access to said electronic calendar.

For instance, the electronic calendar may be stored in said first device.

Advantageously, said first device comprises a motion sensor.

This motion sensor may be, for instance, an accelerometer or a gyroscope.

According to a particular embodiment, the first device is a mobile communication terminal, particularly a smartphone or a tablet or a laptop.

The invention also provides a second device, comprising:
a) a calendar module able to access to an electronic calendar;
b) a monitoring module able to monitor at least one wireless link between a first device and said second device; and
c) if said wireless link is disrupted while an event stored in the electronic calendar is imminent, an alert module able to notify a user about a loss of proximity of said first device by triggering an alert having a level depending on the imminence of the event and/or on the location of the first device.

Advantageously, the second device comprises a motion sensor.

Advantageously, the second device is a smart watch.

According to an embodiment, the electronic calendar is stored within the second device.

According to another embodiment, the second device stores only a time of a next event in the electronic calendar stored in the first device, said time being communicated from the first device to said second device before the disruption of the wireless link.

In the case of a smart watch, the status of the motion sensor indicates if the user is moving.

This motion sensor may be, for instance, an accelerometer or a gyroscope.

According to an embodiment, the second device is a smart piece of wearable technology, such as the bracelet described in http://www.kickstartercom/projects/embraceplus/embrace-a-smart-piece-of-wearable-technology. This device is able to alert the user about a loss of proximity of the first device by changing its colour and/or by vibrating.

Another example of second device may be an activity tracker in the form of a bracelet for example.

The method according to the invention may be implemented in software on a programmable apparatus. It may be implemented solely in hardware or in software, or in a combination thereof.

Since the present invention can be implemented in software, the present invention can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The invention thus provides a computer-readable program comprising computer-executable instructions to enable a computer to perform the monitoring method of the invention. The diagrams of FIGS. 4, 6 illustrate examples of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

Figure 1:
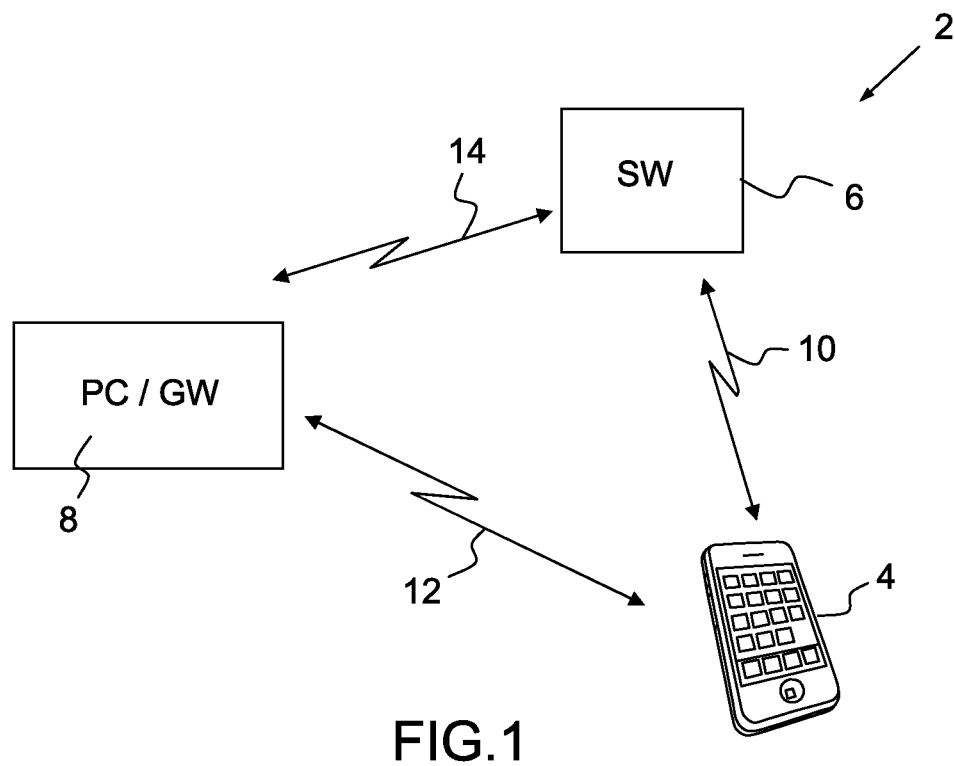
FIG. 1 represents an example of a system implementing the method of the invention.

Referring to FIG. 1, there is shown therein a system 2 for monitoring the location of a first device 4, according to an embodiment of the invention.

According to the illustrated embodiment, the first device 4 is a smartphone. In the following description, the term "smartphone" will refer to the first device 4.

In the illustrated monitoring system 2, a second device 6 and a third device 8 are used to detect the proximity of the first device 4 with each one of the second and third devices 6, 8, respectively.

According to the illustrated embodiment, the second device 6 is a smart watch. In the following description, the term "smart watch" will refer to the second device 6.

The third device 8 may be a residential gateway or a PC or a laptop or any other computer having a wireless interface. For instance, when the user, and also the smartphone 4, is at home, the third device 8 is preferably the residential gateway whereas when the user is at the office, the third device 8 is preferably the user's professional computer, for example a PC or a laptop.

The first device 4 and the second device 6 are connected through a first wireless link 10, for instance a Bluetooth interface.

Besides, the first device 4 and the third device 8 are connected through a second wireless link 12, for instance a Wi-Fi interface.

Furthermore, the second device 6 and the third device 8 are connected through a third wireless link 14, for instance a Wi-Fi interface.

A first embodiment of the invention is described in the following with reference to FIGS. 2 to 4. According to this embodiment, the monitoring device is the first device itself.

Figure 2:
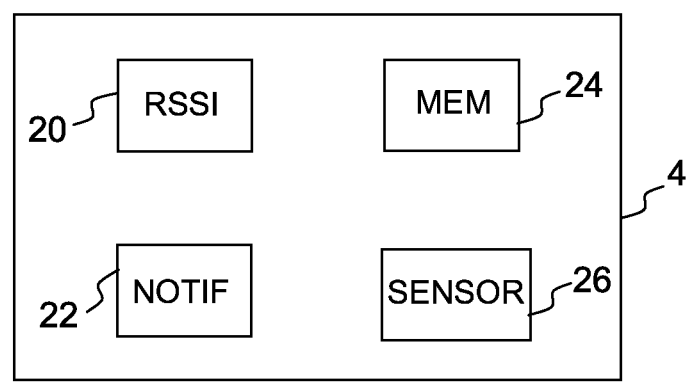
FIG. 2 is a schematic view of a first device according to a first embodiment of the present invention.

FIG. 2 represents the structure of the first device 4 according to the first embodiment of the invention.

The first device 4 comprises a monitoring module 20 able to monitor the wireless links between the first device 4 and the second and third devices 6, 8. Preferably, the monitoring module 20 is able to perform RSSI measurements on the wireless links 10, 12 to perform this monitoring.

The state of the link 10, 12 is OK or disrupted according to the RSSI level measured by the smartphone 4 on the corresponding link, i.e. if the RSSI level is higher than a given threshold, the link state is OK and if the RSSI level is lower than said given threshold, the link state is disrupted.

Preferably, the RSSI threshold corresponding to the first link 10 is fixed as a function of the imminence of an event in the user's calendar in order to be higher when the event is more imminent.

Figure 7:
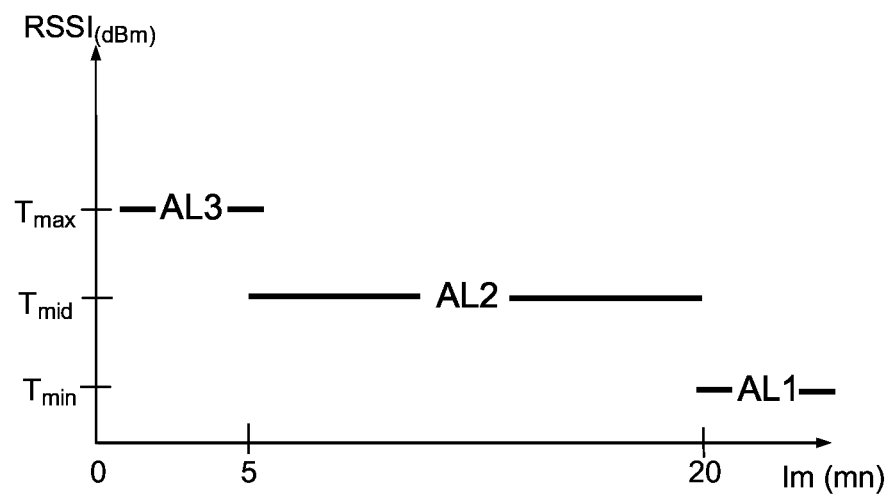
FIG. 7 illustrates the choice of the alert level and the RSSI threshold as a function of the imminence of an event, according to an embodiment of the present invention.

For instance, as represented in FIG. 7, three RSSI thresholds are defined: more than 20 minutes before the event, the RSSI threshold is fixed to a minimum level $T_{min}$; between 5 and 20 minutes before the event, the RSSI threshold is fixed to a medium level $T_{mid}$ and less than 5 minutes before the event, the RSSI threshold is fixed to a maximum level $T_{max}$. These thresholds may be fixed using a learning process.

The first device 4 further comprises a notification module 22 able to send a notification to the second device 6 about a loss of proximity of said first device 4 if the first wireless link 10 with the second device 6 is disrupted while an event stored in the electronic calendar of said user is imminent.

Furthermore, the first device 4 comprises a storage module 24 for storing at least one electronic calendar of the user. The electronic calendar may be a personal and/or a professional calendar.

The first device 4 also comprises a motion sensor 26, for instance an accelerometer or a gyroscope. For clarity of the description, the motion sensor state is assumed to be "ON" when a motion of the first device 4 is detected and "OFF" otherwise.

Figure 3:
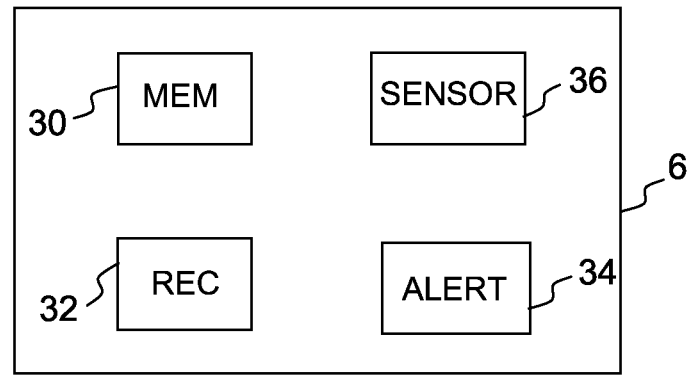
FIG. 3 is a schematic view of a second device according to the first embodiment of the present invention.

FIG. 3 represents the structure of the second device 6 according to the first embodiment of the invention.

The second device 6 comprises a storage module 30 for storing at least one electronic calendar of the user. The electronic calendar may be a personal or a professional calendar. The stored calendar in the second device 6 is synchronised, in a conventional manner, with the calendar stored in the first device 4.

The second device 6 also comprises a receiving module 32 able to receive a notification from the first device 4.

The second device 6 also comprises an alert module 34 able to trigger, in response to the received notification, an alert which level depends on an imminence of an event stored in the electronic calendar. The triggered alert may be of any possible type, for instance audio, visual or textual.

Thus, the alert module 34 comprises speakers and/or a display and/or a LED (Light-Emitting Diode) or any other suitable component for alerting the user.

For instance, three alert levels are defined: more than 20 minutes before the event, the alert level is fixed to a low level AL1; between 5 and 20 minutes before the event, the alert level is fixed to a medium level AL2 and less than 5 minutes before the event, the alert level is fixed to a high level AL3, as this appears in FIG. 7.

The type of location, public or private, which indicates the risk that the smartphone 4 is definitely lost may also be used to set the alert level. If the user and his smartphone 4 are in his own private environment, for example at home, the alert levels above are preferably applied. However, in a public area, the alert level is advantageously set at the highest level automatically. In a visited location like a customer premises or external offices where the risks are mitigated, the minimum alert level can be set to medium, i.e. AL2.

The type of location is either defined by the user himself or by using a GPS. The location modification can also be detected through the discovery of a new network by the smart watch 6. When the smart watch 6 detects an already known network, two types of actions may be triggered depending on if the discovered network is in the same area (in this case the current three links are unchanged) or not. Both situations are illustrated in the following description by two examples.

In the first example, the user is at work and he is leaving his office to go to another floor. His smart watch 6 then discovers another Wi-Fi network which was not accessible previously but wherein the three current links 10, 12, 14 are still in an "OK" state. In this case, there is no variation in the environment and the monitoring continues at the same alert level.

Let us now consider that the user is just leaving his home to take his car parked in front of his house. The detection of the Bluetooth car system is indicating that the user context has changed even if the previous links corresponding to the home context still exist. In this case, the alert level is preferably set to high, i.e. AL3, and the RSSI threshold for determining the first link state is set to maximum $T_{max}$. Then, the user will be alerted that he has forgotten his smartphone 4 before leaving with his car.

The second device 6 also comprises a motion sensor 36, for instance an accelerometer or a gyroscope. For clarity of the description, the motion sensor state is assumed to be "ON" when a motion of the second device 6 is detected and "OFF" otherwise.

Advantageously, the storage module 30 further comprises a table containing a location of the user, an identifier of at least one available network in said location, and a level of risk associated with said location.

The location is provided by the user further to a request from the second device 6 when it discovers a new network. This location may be for instance "my home" or "my work" or "the railway station", etc.

The level of risk corresponds to the risk that the smartphone is lost or stolen in said location. For instance, this risk may be high in a railway station while it is low at home. This risk may be interpreted from the type of location, like public or private area. The user may specify the type of location further to a request from the second device 6.

The network identifier can be a BSSID (Basic Service Set IDentifier) or a MAC address of the access point for a Wi-Fi network or a Universally Unique IDentifier (UUID) for Bluetooth or a Network ID for a Z-Wave network, etc.

A history of this information associated to a given location is stored in a log file within the storage module 30. In case that the first device 4 is lost, this log file allows the user to know what the last known location was.

According to another embodiment, the log file is stored in the first, second and third devices. The log file may also be hosted by a cloud service.

Figure 4:
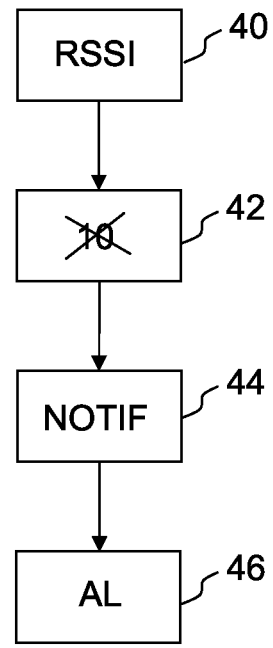
FIG. 4 is a flowchart detailing the steps of the method of monitoring according to the first embodiment of the present invention.

The flowchart of FIG. 4 details the steps of the monitoring method according to the first embodiment of the present invention.

Initially, the user has his smart phone 4 and his smart watch 6 with him. Thus, the first, second and third links 10, 12, 14 are in a state OK. Preferably, a message is displayed on the smartphone 4 and/or the smart watch 6 indicating that both links 10, 12 are OK.

At step 40, the smartphone 4 periodically measures the RSSI level on the first link 10 and the second link 12.

Preferably, the frequency of said monitoring depends on the imminence of an event stored in the user's calendar in order to be higher when the event is more imminent.

Figure 8:
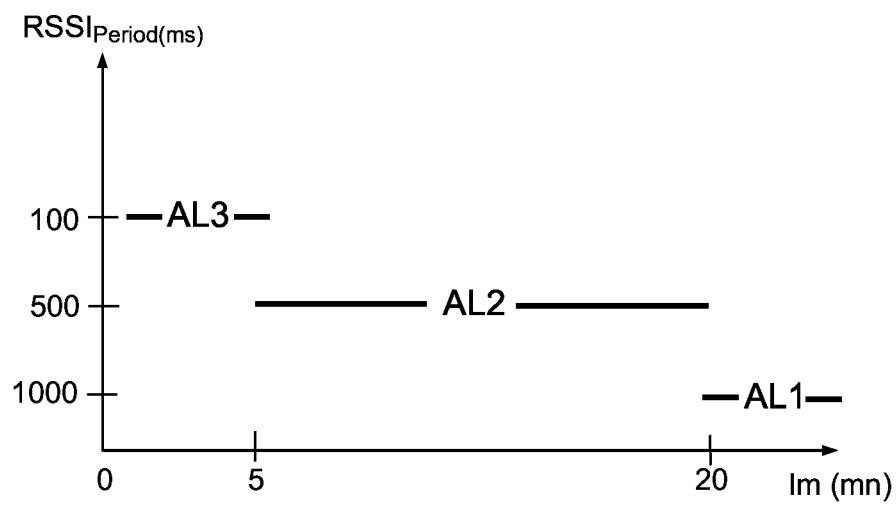
FIG. 8 illustrates the choice of the alert level and the monitoring periodicity as a function of the imminence of an event, according to an embodiment of the present invention.

For instance, as represented in FIG. 8, three periodicities are defined: more than 20 minutes before the event, the monitoring periodicity is fixed to 1000 ms; between 5 and 20 minutes before the event, the monitoring periodicity is fixed to 500 ms and less than 5 minutes before the event, the monitoring periodicity is fixed to 100 ms.

Then, at step 42, for a given reason, the user does not have his smartphone 4 with him while keeping his smart watch 6 with him. If the monitored RSSI on the first link 10 is less than the threshold $T_{min}$ or $T_{mid}$ or $T_{max}$ depending on the imminence of the next event in the user's calendar or on the location of the first device (public or private area for instance), the first link is disrupted at step 42.

In this case, the smartphone 4 sends, at step 44, a notification to the smart watch 6, through the second and third wireless links 12, 14, i.e. through the third device 8. This notification preferably comprises an indication of an alert level to be triggered by the smart watch 6. At step 46, the smart watch triggers an alert corresponding to the alert level indicated in the notification.

Optionally, the smart watch 6 launches, at step 46, a timer to measure the disruption duration. As soon as a predetermined duration is reached, it triggers an alert to notify the user that he forgets his smartphone 4. The duration of the timer may depend on the alert level indicated in the notification. For example, for the low alert level AL1, the timer duration may be fixed to 10 minutes and for the medium alert level AL2, the timer duration may be fixed to 5 minutes.

In the following description, an example of implementation of the method of the invention according to the first embodiment is described.

According to this example, the user is at home. The considered event is the departure time of the user from the home to go to his office which is set, for example, to 8 AM and stored in both calendars of the smartphone 4 and the smart watch 6. The third device 8 is the residential gateway.

Firstly, let's consider a possible scenario that may occur more than 20 minutes before the event.

According to this scenario, the user goes far from his smartphone 4, while still remaining at home. In this case, the smart watch motion sensor 36 is "ON" while the smartphone motion sensor 26 is "OFF".

If the measured RSSI on the first link 10 is less than the minimum threshold $T_{min}$ at step 42, the smartphone 4 notifies the smart watch 6 at step 44, using the second and third links 12, 14 which are not disrupted, and indicates that the alert level is low, i.e. AD1. This alert level preferably means that no explicit alert, for example no sound and nothing displayed, is triggered by the smart watch 6 to the user's intention. This mechanism prevents the user from being annoyed with a useless alert.

However, according to a preferred embodiment, in order to anticipate a smartphone oversight, the smart watch 6 updates its log file upon the reception of the notification.

A similar scenario may occur between 20 and 5 minutes before the event.

According to this scenario, at step 42, the user goes far from his smartphone 4, while still remaining at home. In this case, the smart watch motion sensor 36 is "ON" while the smartphone motion sensor 26 is "OFF". If the measured RSSI on the first link 10 is less than the medium threshold $T_{mid}$, the smartphone 4 notifies, at step 44, using the second and third links 12, 14 which are not disrupted, the smart watch 6 which triggers, at step 46, a medium level alert AL2, for example a reminder displayed on the smart watch screen, to notify the user that he should retrieve his smartphone 4 in order to not forget it prior leaving home. This alert may be triggered immediately or after a period of time following the reception of the notification from the smartphone 4.

A similar scenario may occur less than 5 minutes before the event. In this case, the alert level is set at the highest level AL3 and the RSSI monitoring periodicity is set to 100 ms. This means that within this time range, the user will have an explicit alert such as a bip sound on his smart watch each time that the first link 10 is disrupted.

A second embodiment of the invention is described in the following with reference to FIGS. 5 and 6. According to this embodiment, the monitoring device is the second device.

Preferably, according to this embodiment, the first device 4 comprises the storage module 24 and the sensor module 26 described with reference to the first embodiment.

Figure 5:
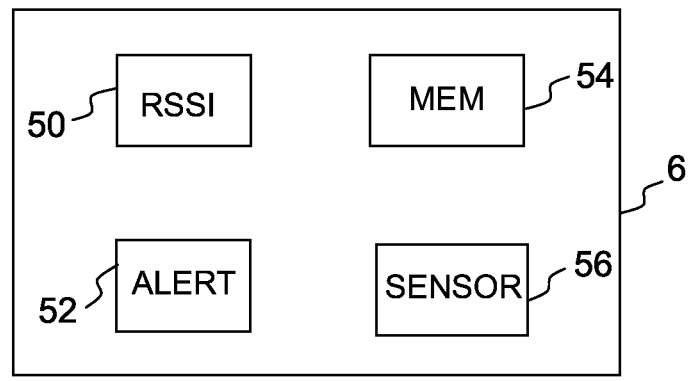
FIG. 5 is a schematic view of a second device according to a second embodiment of the present invention.

FIG. 5 represents the structure of the second device 6 according to the second embodiment of the invention.

The second device 6 comprises a monitoring module 50 able to monitor the wireless links between the second device 6 and the first and third devices 4, 8. Preferably, the monitoring module 50 is able to perform RSSI measurements on the wireless links 10, 14 to perform this monitoring.

The state of the link 10, 14 is OK or disrupted according to the RSSI level measured by the smart watch 6 on the corresponding link, i.e. if the RSSI level is higher than a given threshold, the link state is OK and if the RSSI level is lower than said given threshold, the link state is disrupted.

Preferably, the RSSI threshold corresponding to the first link 10 is fixed, as in the first embodiment, as a function of the imminence of an event in the user's calendar in order to be higher when the event is more imminent.

The second device 6 further comprises an alert module 52 able to trigger an alert to notify the user about a loss of proximity of the first device 4 if the first wireless link 10 with the second device 6 is disrupted while an event stored in an electronic calendar of said user is imminent. The level of the triggered alert depends on the imminence of the event stored in the electronic calendar. The triggered alert may be of any possible type, for instance audio, visual or textual.

Thus, the alert module 52 comprises speakers and/or a display and/or a LED (Light-Emitting Diode) or any other suitable component for alerting the user.

For instance, three alert levels are defined, as in the first embodiment, i.e. more than 20 minutes before the event, the alert level is fixed to a low level AD1; between 5 and 20 minutes before the event, the alert level is fixed to a medium level AL2 and less than 5 minutes before the event, the alert level is fixed to a high level AL3.

As in the first embodiment, the type of location, public or private, which indicates the risk that the smartphone 4 is definitely lost may also be used to set the alert level.

Furthermore, the second device 6 comprises a storage module 54 for storing at least one electronic calendar of the user. The electronic calendar may be a personal and/or a professional calendar. The stored calendar in the second device 6 is synchronised, in a conventional manner, with the calendar stored in the first device 4.

The second device 6 also comprises a motion sensor 56, for instance an accelerometer or a gyroscope. For clarity of the description, the motion sensor state is assumed to be "ON" when a motion of the second device 6 is detected and "OFF" otherwise.

Advantageously, the storage module 54 further comprises a table containing a location of the user, an identifier of at least one available network in said location, and a level of risk associated with said location.

The location is provided by the user further to a request from the second device 6 when it discovers a new network. This location may be for instance "my home" or "my work" or "the railway station", etc.

As in the first embodiment, the level of risk corresponds to the risk that the smartphone is lost or stolen in said location.

The network identifier can be a BSSID (Basic Service Set IDentifier) or a MAC address of the access point for a Wi-Fi network or a Universally Unique IDentifier (UUID) for Bluetooth or a Network ID for a Z-Wave network, etc.

A history of this information associated with a given location is stored in a log file within the storage module 54. In case the first device 4 is lost, this log file allows the user to know what was the last known location.

According to another embodiment, the log file is stored in the first, second and third devices. The log file may also be hosted by a cloud service.

Figure 6:
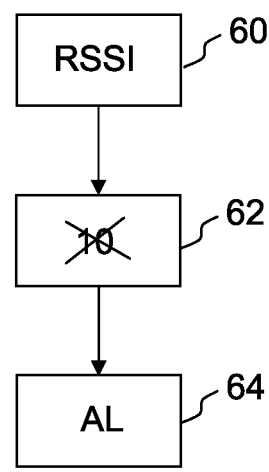
FIG. 6 is a flowchart detailing the steps of the method of monitoring according to the second embodiment of the present invention.

The flowchart of FIG. 6 details the steps of the monitoring method according to the second embodiment of the present invention.

Initially, the user has his smart phone 4 and his smart watch 6 with him. Thus, the first, second and third links 10, 12, 14 are in a state OK. Preferably, a message is displayed on the smartphone 4 and/or the smart watch 6 indicating that both links 10, 14 are OK.

At step 60, the smart watch 6 periodically measures the RSSI level on the first link 10 and the third link 14.

Preferably, the frequency of said monitoring depends on the imminence of the event in order to be higher when the event is more imminent.

For instance, as represented in FIG. 8, three periodicities are defined: more than 20 minutes before the event, the monitoring periodicity is fixed to 1000 ms; between 5 and 20 minutes before the event, the monitoring periodicity is fixed to 500 ms and less than 5 minutes before the event, the monitoring periodicity is fixed to 100 ms.

Then, at step 62, for a given reason, the user does not have his smart phone 4 with him while keeping his smart watch 6 with him. If the monitored RSSI on the first link 10 is less than the threshold $T_{min}$ or $T_{mid}$ or $T_{max}$ depending on the imminence of the next event in the user's calendar or on the location of the first device 4 (public or private area for instance), the first link is disrupted at step 62.

In this case, the smart watch 6 triggers, at step 64, an alert which level is defined as described above.

Optionally, the smart watch 6 launches, at step 64, a timer to measure the disruption duration. As soon as a predetermined duration is reached, it triggers an alert to notify the user that he forgets his smartphone 4. The duration of the timer may depend on the alert level. For example, for the low alert level AL1, the timer duration may be fixed to 10 minutes and for the medium alert level AL2, the timer duration may be fixed to 5 minutes.

In the following description, examples of implementation of the method of the invention according to the second embodiment are described.

According to a first example, the user is at home. The considered event is the departure time of the user from the home to go to his office which is set, for example, to 8 AM and stored in both calendars of the smartphone 4 and the smart watch 6. The third device 8 is the residential gateway.

Firstly, let's consider some possible scenarios that may occur more than 20 minutes before the event.

According to a first scenario, the user goes far from his smartphone 4, while still remaining at home. In this case, the smart watch motion sensor 56 is "ON" while the smartphone motion sensor is "OFF".

If the measured RSSI on the first link 10 is less than the minimum threshold $T_{min}$ at step 62, the smart watch 6 triggers, at step 64, an alert which level is low, i.e. AD1. This alert level preferably means that no explicit alert, for example no sound and nothing displayed, is triggered by the smart watch 6 to the user's intention. This mechanism prevents the user from being annoyed with a useless alert.

However, according to a preferred embodiment, in order to anticipate a smartphone oversight, the smart watch 6 updates its log file.

According to a second scenario, the user leaves home. This fact is preferably detected by the state of the smart watch motion sensor 56.

In a variant, the detection of the user leaving home can be performed by another location mechanism, for example by using a GPS in the smart watch, or by using a wireless location system based on Wi-Fi monitoring or GSM cell detection.

If the user has his smartphone 4 with him, the first link 10 is still OK but not the second and third links 12, 14. The motion sensors states 26, 56 are "ON". In this case, no alert is triggered by the smart watch 6.

If the user does not have his smartphone 4 with him, the first and third links 10, 14 are disrupted while the second link 12 is OK. Furthermore, in this case, the smart watch motion sensor 56 is "ON" while the smartphone motion sensor is "OFF".

After a certain period of time, for instance 5 minutes, a medium alert level AL2 is triggered by the smart watch 6, for example by displaying a message on the smart watch screen, to notify the user that he forgot his smartphone 4 at home. When the user comes back home, all the three links 10, 12, 14 return to the OK state.

However, if the smart watch 6 detects a new location, for example if a Bluetooth connection is established by the smart watch 6 in the user's car, this means that the user is leaving to work before the planned time. In this case, the log file indicates that when the first link 10 was OK, the location was the user's home. Preferably, the alert level is then set to high, i.e. AL3, and the smart watch 6 triggers a sound alert, such as a bip sound or similar, in order to indicate to the user that he forgot his smartphone 4 at home.

Similar scenarios may occur between 20 and 5 minutes before the event.

According to a first scenario, at step 62, the user goes far from his smartphone 4, while still remaining at home. In this case, the smart watch motion sensor 56 is "ON" while the smartphone motion sensor is "OFF". If the measured RSSI on the first link 10 is less than the medium threshold $T_{mid}$, the smart watch 6 triggers, at step 64, an alert having a medium level, i.e. AL2, for example a reminder displayed on the smart watch screen, to notify the user that he should retrieve his smartphone 4 in order to not forget it prior leaving home. This alert may be triggered immediately or after a period of time following the disruption of the first link 10.

According to a second scenario, the user leaves home without his smartphone 4. This fact is preferably detected by the state "ON" of the smart watch motion sensor 56 and the state "OFF" of the smartphone motion sensor. In this case, the first and third links 10, 14 are disrupted while the second link 12 is OK. Then, the smart watch 6 triggers, at step 64, a medium level alert AL2.

Preferably, after a certain period of time, for instance 1 minute, the alert level is changed to a high level alert AL3, for example in the form of a bip sound, to notify the user that he forgot his smartphone 4 at home. When the user comes back home, all the three links return to the OK state.

Similar scenarios may occur less than 5 minutes before the event. In this case, the alert level is set at the highest level AL3 and the RSSI monitoring periodicity is set to 100 ms. This means that within this time range, the user will have an explicit alert such as a bip sound on his smart watch each time that the first link 10 is disrupted.

According to a preferred embodiment, each time that there is a disruption of one of the three links 10, 12, 14, a log file is either created or enriched. This is advantageous, as in the case when the user misses the alert for any reason and then effectively forgets his smartphone 4, he can access to the last location of the smartphone 4 thanks to the log file.

According to a second example, the user is at the office. The third device 8 is the user's laptop.

The considered event is a business trip departure at 11 AM and is stored in both calendar modules of the smartphone 4 and the smart watch 6.

Until 20 minutes before the event, the smart watch 6 performs RSSI measures on the first link 10 with a periodicity set to 1000 ms. As in the first example, if the first link 10 is disrupted, no explicit alert is triggered, i.e. a low level alert AD1. However, a log file is maintained containing the three 10, 12, 14 links states.

From 20 to 5 minutes prior to the scheduled event, the RSSI monitoring periodicity is set to 500 ms.

If the first link 10 is disrupted while the smart watch sensor 56 is "ON" and the smartphone motion sensor is "OFF", this means that the user is leaving his office without his smartphone 4.

In this case, the smart watch 6 triggers, at step 64, a medium level alert AL2, for example a reminder displayed on the smart watch screen, to notify the user that he should retrieve his smartphone 4. This alert may be triggered immediately or after a period of time following the disruption of the first link 10.

From 5 minutes prior to the scheduled event until the event time, the RSSI monitoring periodicity is increased to 100 ms.

If the first link 10 is disrupted while the smart watch sensor 36 is "ON" and the smartphone motion sensor is "OFF", this means that the user is leaving his office without his smartphone 4. In this case, the smart watch 6 triggers, at step 64, a high level alert AL3, for example a bip sound, to notify the user that he forgets his smartphone 4 in his office.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed as a reference to the plural and vice versa.

A person skilled in the art will readily appreciate that various parameters disclosed in the description may be modified and that various embodiments disclosed and/or claimed may be combined without departing from the scope of the invention.

Indeed, although the description above considered monitoring the proximity of a first device with a second device carried by the user, in order to have said first device at the good time, the present invention may be advantageously used in the purpose of obtaining the first device location.

For example, if the user wishes to check if he forgot his smartphone 4 at home, he may connect, via an internet connection, to the residential gateway which provides him the second link 12 status and the smartphone motion sensor 26 status. If the second link 12 is OK and the smartphone motion sensor 26 status is "OFF", this means that the smartphone 4 is at home. However, if the second link 12 is disrupted and the smart phone motion sensor 26 is "ON", this means that somebody brought it.

Besides, even if the considered first device in the above description has a motion sensor, the invention may be applied to the monitoring of a first device without such motion sensor. For instance, when the user is visiting a client at a new office premise, the first device is his laptop, the second device is his smartphone and the third device is a Wi-Fi guest access point.

The invention claimed is:

1. A method of monitoring a first device proximity to a second device, the method comprising:
    monitoring at least one wireless link between said first device and said second device;
    notifying a user about a loss of proximity of said first device by triggering an alert of the loss of proximity of said first device by the second device when said at least one wireless link is disrupted while a calendar event stored in an electronic calendar is imminent; and increasing, from a lower level to a higher level, the alert of the loss of proximity of said first device as the calendar event becomes more imminent, wherein the monitoring of the at least one wireless link is performed periodically by the first device or by the second device, wherein a frequency of said monitoring increases as the calendar event becomes more imminent.

2. The method of claim 1, wherein the at least one wireless link is disrupted when a Received Signal Strength Indication, RSSI, measured on said at least one wireless link between the first device and the second device is less than a threshold.

3. The method of claim 2, wherein said threshold increases as said calendar event becomes more imminent.

4. The method of claim 1, wherein if the first device is in a public area, said method comprises locking said first device when the at least one wireless link with the second device is disrupted.

5. The method of claim 1, wherein the level of the alert further depends on a location type of the first device, said location type belonging to a set consisting of a public location and a private location.

6. A first device for monitoring proximity with a second device, said first device comprising a processor configured to:
monitor at least one wireless link between said first device and a second device;
send to the second device a notification about a loss of proximity of said first device, wherein the notification triggers an alert of the loss of proximity of said first device in the second device when said at least one wireless link is disrupted while a calendar event stored in an electronic calendar is imminent; and
increase, from a lower level to a higher level, the alert of the loss of proximity of said first device as the calendar event becomes more imminent,
wherein the at least one wireless link is periodically monitored by the first device or by the second device at a frequency increasing as the calendar event becomes more imminent.

7. The first device of claim 6, wherein said first device is able to access to said electronic calendar.

8. The first device of claim 6, wherein said first device comprises a motion sensor.

9. The first device of claim 6, wherein said first device is a mobile communication terminal, particularly a smartphone or a tablet or a laptop.

10. The first device of claim 6, wherein the level of the alert further depends on a location type of the first device, said location type belonging to a set consisting of a public location and a private location.

11. A second device monitoring a proximity with a first device, said second device comprising a processor configured to:
access to an electronic calendar;
monitor at least one wireless link between a first device and said second device;
notify a user about a loss of proximity of said first device by triggering an alert of the loss of proximity of said first device when said at least one wireless link is disrupted while a calendar event stored in an electronic calendar is imminent; and
increase, from a lower level to a higher level, the alert of the loss of proximity of said first device as the calendar event becomes more imminent,
wherein the at least one wireless link is periodically monitored by the first device or by the second device at a frequency increasing as the calendar event becomes more imminent.

12. The second device of claim 11, wherein said second device comprises a motion sensor.

13. The second device of claim 11, wherein said second device is a smart watch.

14. A non-transitory computer readable medium comprising computer-executable instructions which upon execution cause a processor to:
monitor at least one wireless link between a first device and a second device;
notify a user about a loss of proximity of said first device by triggering an alert of the loss of proximity of said first device by the second device when said at least one wireless link is disrupted while a calendar event stored in an electronic calendar is imminent; and
increase, from a lower level to a higher level, the alert of the loss of proximity of said first device as the calendar event becomes more imminent,
wherein the at least one wireless link is periodically monitored by the first device or by the second device at a frequency increasing as the calendar event becomes more imminent.

15. A method for monitoring proximity between devices, said method comprising:
accessing, by a second device, an electronic calendar;
monitoring, by the second device, at least one wireless link between a first device and said second device;
notifying, by the second device, a user about a loss of proximity of said first device by triggering an alert of the loss of proximity of said first device, by the second device when said at least one wireless link is disrupted while a calendar event stored in an electronic calendar is imminent; and
increasing, from a lower level to a higher level, the alert of the loss of proximity of said first device as the calendar event becomes more imminent,
wherein the at least one wireless link is periodically monitored by the first device or by the second device at a frequency increasing as the calendar event becomes more imminent.

16. The method of claim 15, wherein said second device comprises a motion sensor.

17. The method of claim 15, wherein said second device is a smart watch.

* * * * *